April 9, 1968  E. L. PARR  3,376,667

ONE-WAY ROLLER BARRIER FOR PARKING LOT

Filed Sept. 2, 1966  2 Sheets-Sheet 1

INVENTOR.
EDWARD L. PARR

BY

ATTORNEYS

April 9, 1968   E. L. PARR   3,376,667
ONE-WAY ROLLER BARRIER FOR PARKING LOT
Filed Sept. 2, 1966   2 Sheets-Sheet 2

INVENTOR.
EDWARD L. PARR

BY

ATTORNEYS

United States Patent Office 3,376,667
Patented Apr. 9, 1968

3,376,667
ONE-WAY ROLLER BARRIER FOR PARKING LOT
Edward L. Parr, El Cajon, Calif., assignor to Wendell L. Thompson, Burbank, Calif.
Filed Sept. 2, 1966, Ser. No. 577,043
10 Claims. (Cl. 49—49)

ABSTRACT OF THE DISCLOSURE

A roller barrier apparatus, in which roller mechanism lies in the normal path of movement of a vehicle traction wheel, which roller mechanism can be rendered effective or ineffective whereby when effective it functions as a barrier for movement of the traction wheel.

---

This invention relates to a vehicle barrier and particularly to a barrier that includes rotatable mechanism lying in the path of the vehicle for preventing the vehicle traction tire from getting sufficient traction to move forwardly.

This barrier comprises rotatable mechanism that is supported in the normal path of the traction wheel, by supporting means. Platform means is disposed on the vehicle approach side of the rotatable mechanism. One of said means is movable vertically relative to the other for varying the vertical height between the platform means and the rotatable mechanism. Means is also provided for locking the aforesaid means to prevent said relative vertical movement.

Other features and the advantages of the present invention will be apparent from the following description, reference being had to the accompanying drawings wherein a preferred embodiment of the invention is illustrated.

Figure 5:
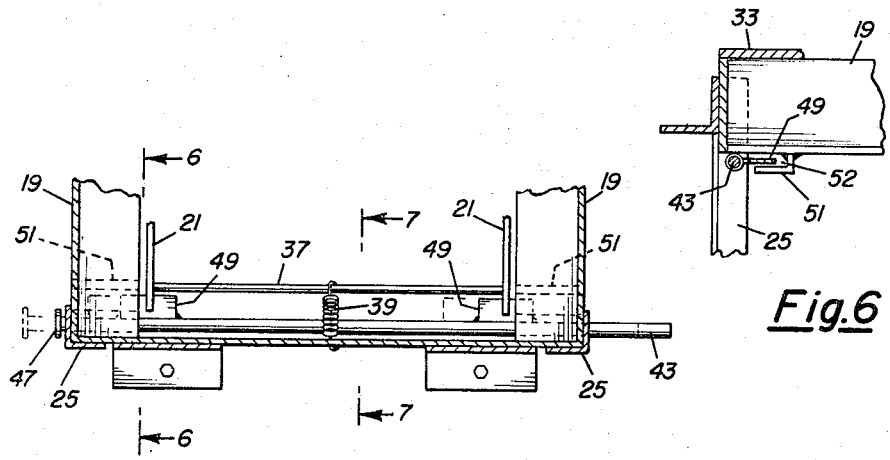
Figure 6:
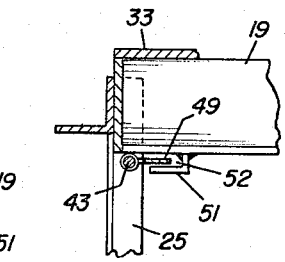
Figure 7:
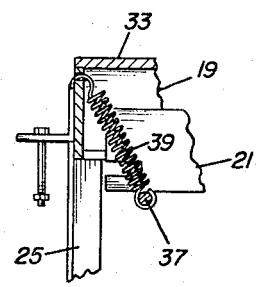
Figure 1:
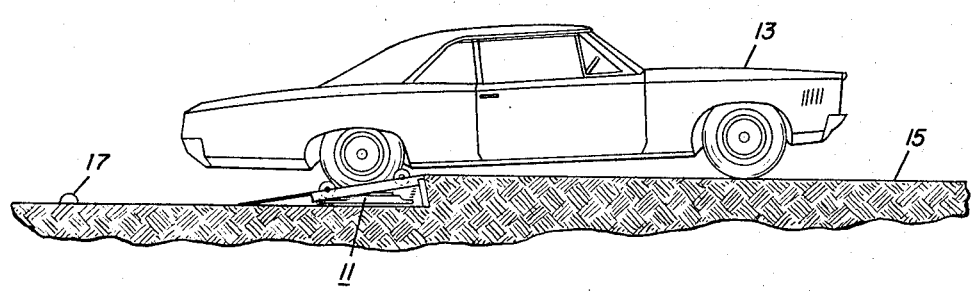
Figure 2:
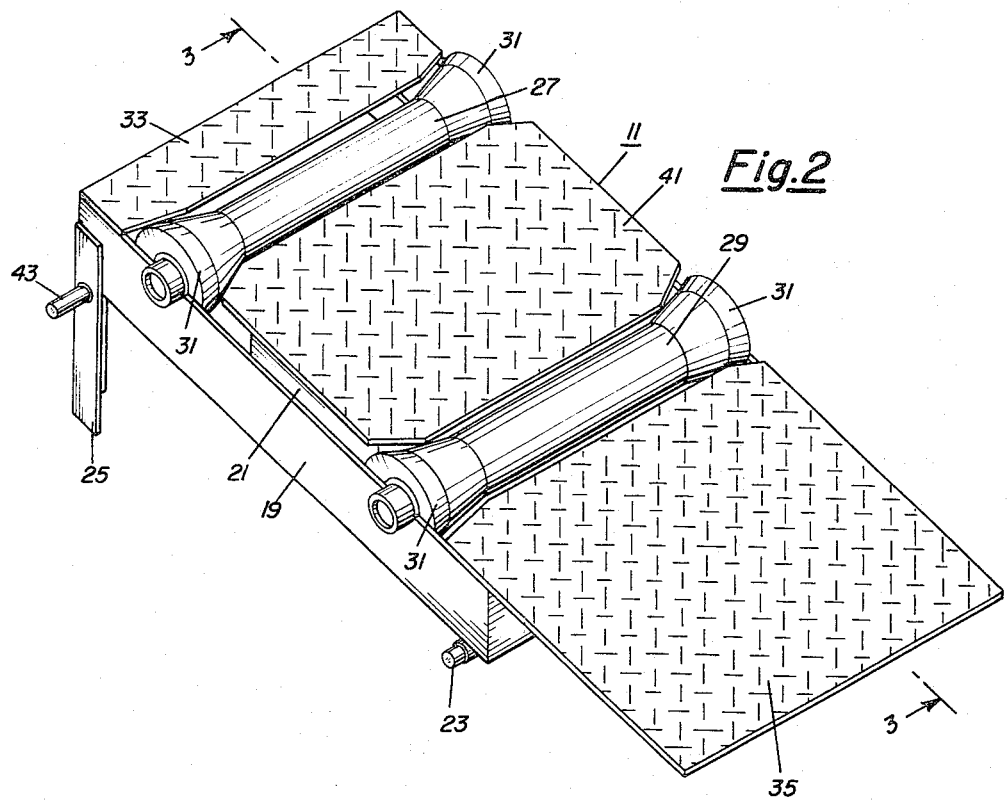
Figure 3:
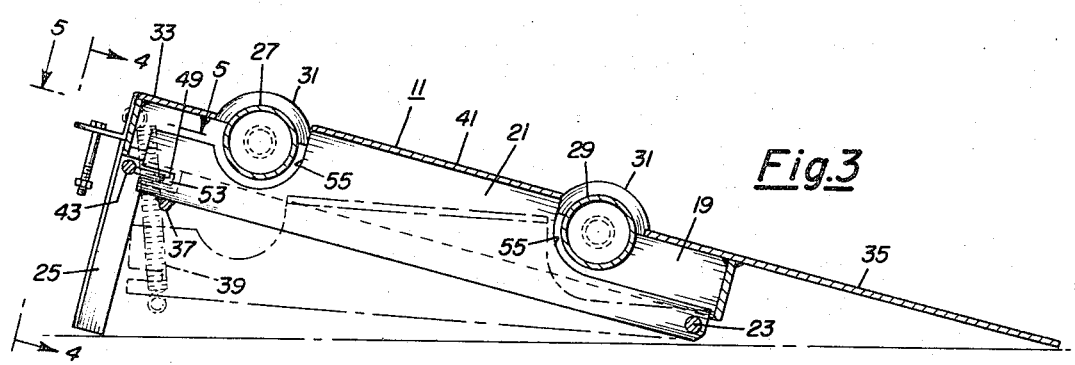
Figure 4:
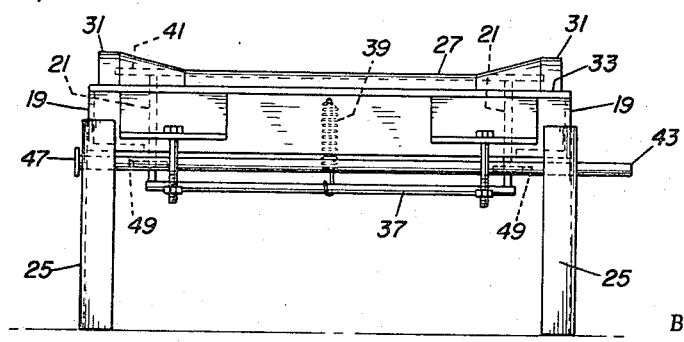

In the drawings:
FIG. 1 is a side view of an automobile having a rear traction tire, it being on the roller barrier of this invention, the ground being shown in section;
FIG. 2 is a perspective view of the roller barrier shown in FIG. 1, but shown on a larger scale;
FIG. 3 is a sectional view of the barrier shown in FIG. 2, the view being taken along the line 3—3 of FIG. 2;
FIG. 4 is an end view of the barrier shown in FIG. 2, the view being taken along the line 4—4 of FIG. 3;
FIG. 5 is a fragmentary sectional view of the roller barrier shown in FIG. 2, the view being taken along the line 5—5 of FIG. 3;
FIG. 6 is a fragmentary sectional view of the roller barrier shown in FIG. 2, the view being taken along the line 6—6 of FIG. 5; and
FIG. 7 is a fragmentary sectional view of the roller barrier shown in FIG. 2, the view being taken along the line 7—7 of FIG. 5.

Referring more in detail to the drawings, the barrier 11 is shown in FIG. 1 for barring access of the automobile 13 to the parking lot 15. Ledges or curbs are provided along the approach side to the barrier 11 to induce slowing of the automobile 13 as it approaches the barrier. One of these ledges is shown at 17.

The barrier 11 includes a main frame 19 and a secondary frame 21. The secondary frame 21 is pivotally attached on one end to the main frame 19 by a shaft 23. The main frame 19 is generally inclined and is supported on the upper end by legs 25.

Rotatable mechanism, in the form of rollers 27 and 29, is rotatably supported by the main frame 19. The rollers 27 and 29 include conical shaped enlargements 31 on each end thereof, thus providing lateral guides for the automobile tire to prevent the tire from slipping off the ends of the rollers 27 or 29.

A rigid platform section 33 is supported on the upper end of the frame 19. An inclined ramp 35 is supported on one end by the lower end of the frame 19.

A rod 37 depends from the upper end of the secondary frame 21 and a tension spring 39 is affixed thereto on one end and is attached to the main frame 19 on the other end thereby providing for biasing the sub-frame 21 upwardly around the pivot shaft 23. The sub-frame 21 includes a movable platform 41 and is moved into tire supporting position between the rollers 27 and 29 when the secondary frame 21 is biased into the upper position.

An elongated latch rod 43 is slidably supported in holes 45 in the legs 25. The rod 43 is upset on one end to form a head 47 to limit movement of the rod 43 to the right, as viewed in FIG. 4. Two tongues 49 extend laterally from the rod 43 and are supported on their extended ends in the slot 50 formed by the latch supports 51 that are affixed to the main frame 19. Slots 53 are included in the sub-frame 21 and are aligned with the slots 50 when the secondary frame 21 is in its upper position. The tongues 49 may then be moved into the notches 53 thereby locking the secondary frame 21 in its upper position. The secondary frame 21 includes two cut-outs 55 that are adapted to accept the roller 27 and to abut the lower surface of the roller to limit the upward movement of the sub-frame 21 with the notches 53 and 52, in alignment.

The rollers 27 and 29 and the platform 41 are arranged such that when the latch tongues 49 are disengaged from the notches 53, and an automobile tire is moved onto the platform 41 and the platform depressed, the weight of the tire and automobile is supported mainly by the rollers 27 and 29. Some of the automobile 13 weight is carried by the platform 41 and it will be clear that as the rear end drive automobile 13 is actuated in a forward gear, the tire will spin on the freely rotatable rollers 27 and 29.

Since the roller 29 is at a lower elevation than the roller 27, and since some of the tire and automobile weight is carried on the platform 41, there is sufficient traction between the tire and platform 41 to effect rearward movement of the automobile 13, whereby it can be backed over the roller 29 and off the ramp 35. This will leave the platform 41 free to be moved to its elevated position by the biasing spring 39.

It will be clear that the barrier 11 would also operate effectively if the roller 29 was omitted. In that configuration, the weight of the automobile would be carried by the platform 41 and when the platform was depressed, forward movement would still be barred by the roller 27, since upon actuation of the tire in the forward direction, the tire would tend to lift itself from the platform and onto the roller 27. This would decrease the traction between the platform and the tire and the tire would spin against the freely rotatable roller 27. The roller 29, however, serves the purpose of eliminating substantially all traction with the platform, thus eliminating all tendency of the tire to move forwardly.

By moving the latching tongues 49 into engagement with the notches 53, the platform 41 will be locked into its elevated position, thus providing support for the tire as it passes thereover. It will be clear that actuation of the rod 43 may be accomplished hydraulically, electrically or by any other obvious means. The rod 43 is preferably actuated by an electrical solenoid (not shown) which solenoid, in turn, is actuated by a coin receiving mechanism (not shown). The coin receiving mechanism is preferably disposed accessible to the automobile 13 driver from the driver's window. Thus, only after the proper coins are deposited by the driver, can the latching rod 43 move the tongues 49 into engagement with the slots 53. Thereafter, the automobile can then proceed over the barrier 11.

From the foregoing, it will be apparent that the barrier 11 of this invention is relatively simple and economical to manufacture. It will also appear that the barrier 11 provides an effective means for controlling entrance to a pay parking lot. It is noted that any malfunctioning of this roller barrier 11 will not cause damage to the automobile 13 passing thereover, and it is further noted that the automobile 13 will not be damaged if it stalls while entering the lot 15.

While the form of embodiment herein shown and described, constitutes preferred form, it is to be understood that other forms may be adopted falling within the scope of the claims that follow.

I claim:
1. A roller barrier for a vehicle having a traction wheel, said barrier comprising in combination:
   (A) Rotatable mechanism;
   (B) means for supporting the rotatable mechanism in the normal path of movement of the traction wheel;
   (C) platform means disposed in said normal path of movement of said traction wheel and lying on the wheel approach side of the rotatable mechanism, one of said means being movable vertically relative to the other for varying the vertical height therebetween upon application of traction wheel pressure on one of the means whereby said rotatable mechanism provides a rotatable barrier;
   (D) and mechanism for locking said first and second mentioned means to prevent said relative vertical movement therebetween.

2. A roller barrier as defined in claim 1, characterized in that said rotatable mechanism (A) is elongated and is rotatable about an axis disposed transversely of the direction of the normal path of the traction wheel and further characterized to include:
   (1) an enlargement at one end.

3. A roller barrier as defined in claim 1, characterized in that one of said means is biased into an elevated position with respect to the other said means.

4. A roller barrier as defined in claim 1, characterized in that the platform means moves downwardly to a position in which the rotatable mechanism becomes a rotatable barrier.

5. A roller barrier as defined in claim 2, characterized in that said rotatable mechanism (A) includes:
   (2) a second enlargement spaced at a sufficient distance from said first mentioned enlargement (A)(1) to provide a traction surface on the rotatable means between the enlargements at least equal to the width of the tire.

6. A roller barrier as defined in claim 5, characterized in that said platform means (C) is biased into an elevated position.

7. A roller barrier as defined in claim 5, characterized in that the platform means moves downwardly to a position in which the rotatable mechanism becomes a rotatable barrier, and further characterized to include:
   (E) a second rotatable mechanism disposed on the approach end of said platform means (C) and adapted to co-operate with said first mentioned rotatable mechanism (A) to provide support for the traction wheel when said platform is in the down position.

8. A roller barrier as defined in claim 7, characterized in that said rotatable mechanisms (A) and (E) co-operate with said platform means (B) when the platform is in the down position, to provide support for the traction wheel.

9. A roller barrier as defined in claim 7, characterized in that said second mentioned rotatable mechanism (E) is disposed at a lower elevation than said first mentioned rotatable mechanism (A).

10. A roller barrier as defined in claim 7, characterized in that said platform means (C) is inclined from said second mentioned rotatable mechanism (E) to said first mentioned rotatable mechanism (A).

References Cited

UNITED STATES PATENTS

| | | | |
|---|---|---|---|
| 1,827,886 | 10/1931 | Gillespie | 104—44 |
| 1,833,354 | 11/1931 | Burnett | 246—125 |
| 3,049,062 | 8/1962 | Irwin. | |
| 3,324,805 | 6/1967 | Mulch | 246—272 X |

DAVID J. WILLIAMOWSKY, *Primary Examiner.*

DENNIS L. TAYLOR, *Examiner.*